United States Patent [19]

Fell et al.

[11] Patent Number: 4,522,673

[45] Date of Patent: Jun. 11, 1985

[54] HEAT INSULATING BLANKET

[75] Inventors: Barry M. Fell, Dublin, Calif.; Peter R. Ciriscioli, Reno, Nev.

[73] Assignee: Hexcel Corporation, San Francisco, Calif.

[21] Appl. No.: 373,757

[22] Filed: Apr. 30, 1982

[51] Int. Cl.³ .................... B29C 25/00; B32B 7/08; F04B 1/78; F16L 59/00

[52] U.S. Cl. .................... 156/307.3; 112/440; 112/441; 156/93; 264/31; 264/236; 428/35; 428/80; 428/193; 428/233; 428/251; 428/252; 428/920

[58] Field of Search .................... 428/290, 921, 80, 35, 428/193, 233, 251, 252; 264/31, 236; 156/307.3, 93; 112/440, 441

[56] References Cited

U.S. PATENT DOCUMENTS 4,255,483  3/1981  Byrd et al. .................... 428/921
4,308,308  12/1981  Sachse .................... 428/290
4,310,585  1/1982  Shannon .................... 428/920

*Primary Examiner*—James C. Cannon
*Attorney, Agent, or Firm*—Townsend and Townsend

[57] ABSTRACT

A blanket formed of heat and flame resistant materials and adapted to be placed adjacent to a structural part to isolate it thermally from other, adjacent structural parts. The blanket is comprised of a layer of insulation material coupled to a layer of fibrous material impregnated with a thermosetting resin. When the blanket is in a desired shape, the resin is cured to render the layer of fibrous material substantially rigid so it can support itself as well as the layer of insulating material coupled to it. Layers of a heat and fire resistant fabric such as glass fabric are placed on opposed sides of the layer of insulating material to keep the insulating material intact. In one application, the blanket is molded in the form of a box-like structure which can at least partially surround a structural part, such as an aircraft engine, to form a fireshield to isolate the engine from adjacent structural parts of an aircraft. In another application, the resin-impregnated layer of fibrous material of the blanket is placed adjacent to one surface of a structural part and bonded thereto during the curing of the resin to thereby form a fireshield attached to the structural part. In a third application, the resin-impregnated layer of fibrous material is used without the layer of insulating material and, when the resin is cured, the layer is rigid and forms a box-like structure for at least partially enclosing a structural part.

30 Claims, 4 Drawing Figures

HEAT INSULATING BLANKET

This invention relates to a heat insulating unit for protecting structural components of different types of equipment from heat damage and, more particularly, to an improved heat insulating blanket capable of withstanding flame temperatures exceeding 2,000° F.

BACKGROUND OF THE INVENTION

In protecting the components on aircraft from heat damage due to an engine fire, blankets formed from insulating material have been known and used in the past. Generally, blankets of conventional construction which have been used for this purpose require extensive and oftentimes bulky support systems to keep the blankets in their operating positions. Such support systems include frames, sheet metal backing members, fasteners and the like. These systems add considerably to the weight of an aircraft, and it is generally the aim in design of all structural parts of an aircraft to minimize weight if at all possible.

A fire barrier composition material has been disclosed in U.S. Pat. No. 4,225,483 in which the material is capable of withstanding a 2,000° F. flame temperature. However, the composition material of this patent relates to the enhancement of a resin impregnated in a graphite fiber or glass cloth to stabilize any char that forms when the material is subjected to a flame. Other disclosures relating to composite structural members formed from a number of adjacent layers include U.S. Pat. Nos. 3,573,123, 3,769,144, 3,993,829 and 4,256,790.

None of the foregoing patents discloses or suggests a heating insulating blanket in which one of the layers of the assembly is impregnated with a resin capable of curing so that layer will define a heat and flame resistant, lightweight fireshield yet the layer will be sufficiently rigid to be self-supporting or to form a support for other layers of insulating material so as to make it suitable for use in aircraft and other applications. Because of this lack, a need has arisen for an improved heat insulating blanket which has the foregoing desirable features, and the present invention satisfies this need.

SUMMARY OF THE INVENTION

The heat insulating blanket of the present invention, in a preferred embodiment, is formed from a composite structure including a layer of a fibrous material impregnated with a thermosetting resin and secured to a layer of insulating material by suitable attachment means, such as a thread which stitches the two layers together. The insulating layer may be in the form of a mat or particles, strands or fibers confined between a pair of heat and fire resistant layers, and the stitching will pass through all of the layers of the assembly.

The layer of fibrous material can be of any suitable construction, such as fibrous glass, silica glass, ceramic cloth, graphite, carbon or aramid fiber cloth, depending upon the maximum temperature to which the blanket is to be subjected. The fibrous material layer becomes rigid upon curing of the resin therein; thus, the assembly of layers forms a fireshield. The fireshield can be mounted so that the rigid layer of fibrous material faces the structural part to be isolated from other structural parts or faces away from the structural part. In the latter case, the rigid layer of fibrous material is bonded to the adjacent structural part during the curing of the resin to thereby attach the blanket to the structural part. This avoids the need for fasteners and adhesives which add to the weight of the blanket.

The primary object of the present invention is, therefore, to provide an improved heat insulating blanket for isolating structural parts from each other wherein the blanket includes a layer of fibrous material having a thermosetting resin impregnated therein and to which a layer of insulating material can be attached so that, upon curing of the resin, the layers form a generally rigid fireshield which conforms to the shape of at least one of the structural parts to be isolated yet the fireshield is lightweight in construction and avoids the need for conventional fasteners which would otherwise increase the weight and complexity of the fireshield.

Another object of this invention is to provide an improved rigid fireshield which will maintain its shape when subject to temperatures in excess of 1800° F.–2000° F.

Other objects of this invention will become apparent as the following specification progresses, reference being had to the accompanying drawing for illustrations of several embodiments of the invention.

Figure 1:
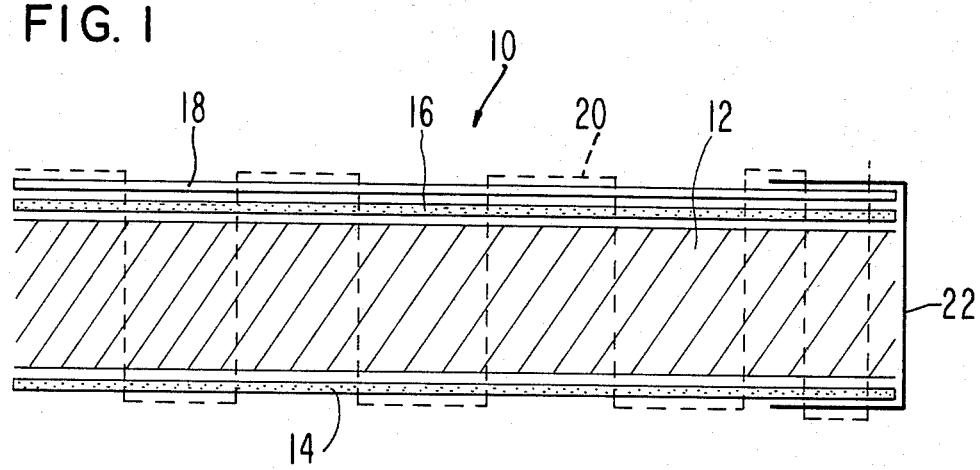
FIG. 1 is an enlarged, fragmentary cross-sectional view, partly schematic, of the heat insulating blanket forming the subject of the present invention.

A preferred embodiment of the insulation blanket of the present invention is broadly denoted by the numeral 10 and is shown in FIG. 1. Insulation blanket 10 is formed from a layer 12 of insulation material, a pair of layers 14 and 16 of a heat and fire resistant material on opposite sides of layer 12, and a layer 18 of a fibrous material impregnated with a thermosetting resin. The resin capable of being cured to a hardened condition upon the application of heat to a predetermined temperature, whereby layer will be rendered rigid and self-supporting.

Insulation blanket 10 is used in a number of different applications adjacent to and between structural parts to present a fireshield for one structural part relative to another structural part. Such a fireshield will prevent the spread of flames from one location to another. Several applications of insulation blanket 10 are described hereinafter.

The insulation material in layer 12, for purposes of illustration, can be either John-Mansville Cerablanket or Babcock and Wilcox Kaowool 2300 NF (AMS3679 or AMS3680). Layer 12 typically has a density of 8 lbs. per cu. ft. and an uncompressed thickness of about 0.5 inch. The material in layer 12 typically is in the form of a loose mat of particles, strands or fibers, and layers 14 and 16 are provided on opposite sides of layer 12 to hold the insulation material particle intact. Heat and fire resistant fabric layers 14 and 16, for purposes of illustration, can be a Style 1528 or Style 1522 (per MIL-C-9084) glass fabric. Alternatively they may be formed from the same fibers which may be used in fabricating layer 18.

Layer 18 is comprised of a cloth woven from fibers capable of withstanding high temperatures. The cloth can be fibrous glass, silica glass, ceramic, graphite, carbon or aramid fiber cloth. Specific types of fibers used to weave the cloth include Nextel made by 3M company, Fiber FP made by DuPont, and Nicalon made by Nippon Carbon Co. The resin is a polyimide, a phenolic, an epoxy or other suitable thermosetting resin.

Layers 12, 14, 16 and 18 are held together by a thread 20 which is stitched through layers 12, 14, 16 and 18 in any suitable pattern. One such stitching pattern is shown in FIG. 1. The thread is of any suitable material which is flame and heat resistant. A typical thread is Astroquartz Q-18 with a 9751 Teflon finish.

Insulation blanket 10 has an edge binding 22 as shown in FIG. 1. This edge binding is of the same fibrous, flame resistant material as layer 18 and is held in place by thread 20 when the thread is stitched to the other layers. In lieu of a separate edge binding 22, an end margin of layer 18 can be wrapped around the assembly of layers 12, 14 and 16 in the position of edge binding 22 (FIG. 1) and held in place by thread 20 stitched to the layers.

Insulation blanket 10 can be used in a number of different applications such as those involving engines which could be the sources of fires. Thus, insulation blanket 10 is especially suitable for use as a fireshield in aircraft, boats, automobiles, locomotives and other vehicles.

In one particular application, insulation blanket 10 can be used as a fireshield for an aircraft engine (FIG. 2) in which layer 18 faces the engine. The fibrous material of layer 18 can withstand high temperatures, such as a 2,000° F. flame temperature; thus, if the engine were to catch fire or if the fuel of the engine were to ignite for any reason in the region adjacent to the engine, layer 18 would prevent the flame from spreading through blanket 10 and onto adjacent structural parts, while at the same time maintaining its shape.

Since layer 18 is impregnated with a thermosetting resin, the insulation blanket 10 can be molded by placing it on a mold and heating the mold for a specific time and at a specific temperature until the resin in layer 18 has cured. After the curing of the resin, layer 18 will be rigid and self-supporting. The rigidity of layer 18 will be such that layer 18 will not only support itself but also will support layers 12, 14 and 16.

Figure 2:
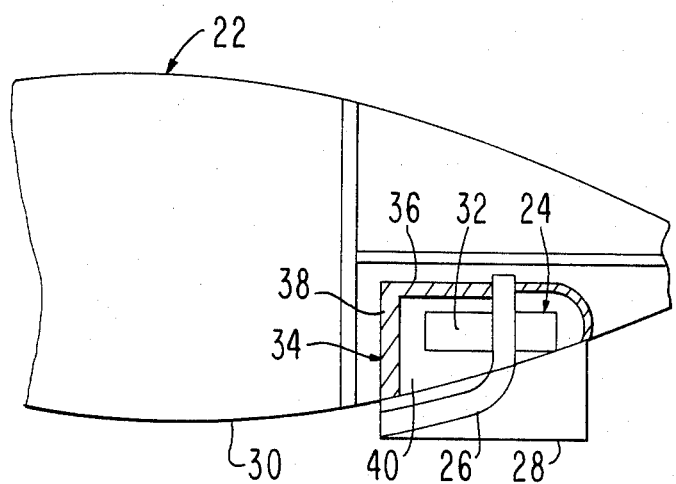
FIG. 2 is a schematic view of an aircraft having a engine at one end of the fuselage with the engine having a fireshield formed from the insulation blanket of the present invention.
Figure 3:
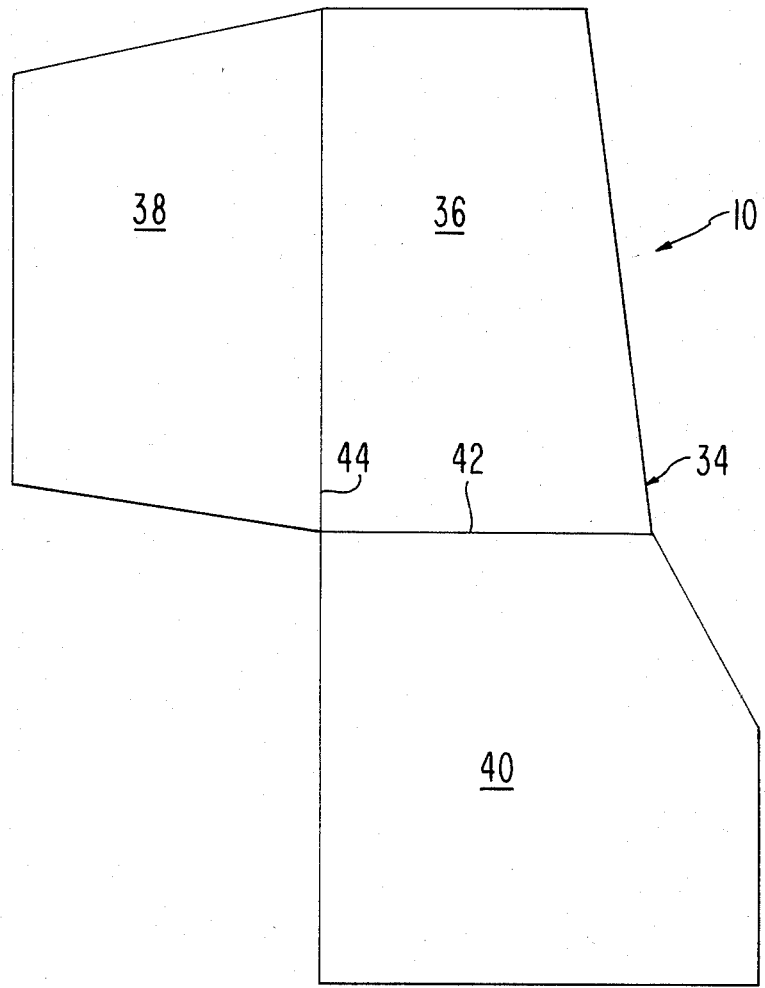
FIG. 3 is a plan view of the insulation blanket of the present invention before it is folded into a desired shape for use as the fireshield for the engine of the aircraft of FIG. 2.

A particular application of insulation blanket 10 is shown in FIGS. 2 and 3 in which an aircraft 22 has an engine 24 at one end thereof. The engine has an air intake duct 26 coupled to an exterior air scoop 28 secured to the side 30 of the aircraft. One part 32 of engine 24 is to be at least partially enclosed by insulation blanket 10. For purposes of illustration, the insulation blanket will initially have the flat shape shown in FIG. 3 and, after a molding step, it will define a fireshield 34 of box-like construction.

Blanket 10 (FIG. 3) has three interconnected panels 36, 38 and 40. These panels are integral with each other since they will be cut from a single sheet to fit adjacent to a specific part of engine 24, namely part 32 shown in FIG. 2. For purposes of illustration, panel 36 forms the bottom of the fireshield while panels 38 and 40 form a pair of adjacent sides of the fireshield. Panels 36 and 40 are hingedly coupled along a fold line 42, and panels 36 and 38 are hingedly coupled along a fold line 44 to form first and second sides of the box-like fireshield.

Blanket 10 is applied to a mold with the panels being in the desired box-like configuration and then subjected to a specific curing temperature so as to cure the resin in the layer 18 forming part of the insulating blanket 10. Upon being cured, layer 18 will be rigid and self-supporting. The resulting product will be the box-like fireshield which is mounted in the aircraft at a location adjacent to the position in which engine 24 is mounted.

Engine 24 has a firewall adjacent to air intake 26 which, when fireshield 34 is in place, will form a third side for the fireshield, and the adjacent side 30 of the aircraft will form the fourth side of the fireshield. A top (not shown) of a suitable material, such as stainless steel, will be used to cover the engine part 32. Blanket 10, when forming the box-like fireshield, will withstand a flame temperature, such as 2000° F., to protect the adjacent structural parts of the aircraft, such as bulkhead 46.

Another structural part 48 of the engine can be provided with a box-like fireshield 49 which does not require the composite structure of fireshield 34. Fireshield 49, for instance, could be formed solely from a layer 18 of fibrous material, (preferably ceramic) impregnated with a thermosetting resin, particularly a condensation type polyimide or a self extinguishing phenolic. Such layer is identical in construction to layer 18 of FIG. 1, but without layers 12, 14 and 16 attached to it. In such a case, the requirements for withstanding flame temperatures to protect structural parts adjacent to engine part 44 would not be as stringent as those required in the region adjacent to engine part 32. In the alternative, fireshield 49 could be of stainless steel or other material which can withstand the maximum temperature which might be reached in this portion of the aircraft.

Figure 4:
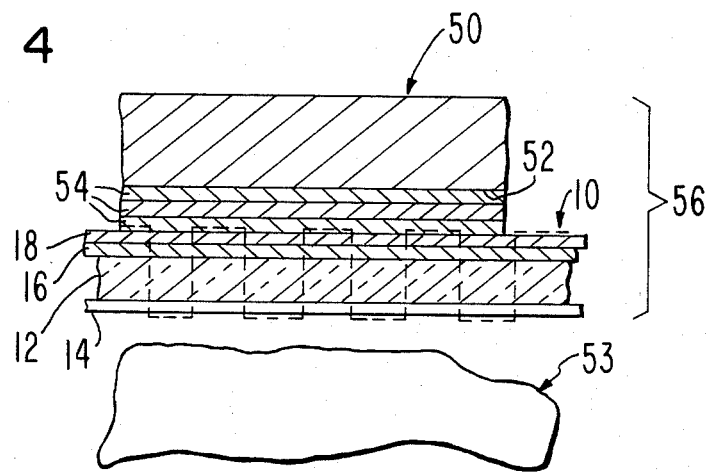
FIG. 4 is a fragmentary cross-sectional view of the insulation blanket and the structural member to which the insulation blanket is attached to provide a fireshield therefor.

Another embodiment of the present invention is the use of composite insulation blanket 10 as a fireshield for a structural part 50 (FIG. 4). As an example, structural part 50 could be a panel of an engine nacelle having an inner surface 52 which is normally adjacent to an engine 53 and which is to be protected from the heat or flame from the engine. To this end, insulation blanket 10 will be positioned so that layer 18 will be facing and in engagement with inner surface 52. When the resin in layer 18 is cured, the layer will be bonded to surface 52.

Typically, a number of other layers 54 of resin-impregnated fibrous material, substantially identical to layer 18 (FIG. 1) will be between structural part 50 and layer 18 of insulation blanket 10. The assembly of layers denoted by the numeral 56 (FIG. 4) will be grouped together and then heat will be applied to cure the resin in layers 18 and 54. When the resin has been cured, blanket 10 will be mechanically attached to structural part 50 yet layer 18 will form, along with layers 54, a fireshield protecting structural part 50 from any flame or high temperatures originating at engine 53 or in the vicinity of engine 53. The layer 14 of blanket 10 shown in FIG. 4 typically will be provided with a fluid impervious surface to prevent any fluids, such as fuel or the like, from penetrating the blanket and impinging on the fireshield.

The advantage of using the blanket in the manner shown in FIG. 4 is that there is no separate facing required for structural part 50. The layer 18 on blanket 10 as secured to structural part 54 not only bonds blanket 10 to part 50 but also simultaneously forms the facing for the structural part. This eliminates the need for relatively heavy glue that is otherwise necessary to attach the blanket to the structural part, resulting in a reduction in weight and in production time and costs.

What is claimed is:

1. A heat insulating blanket comprising: a layer of woven fibrous material having a curable thermosetting resin impregnated therein and capable of withstanding temperatures up to a predetermined value; a layer of high temperatures thermal insulating material comprising a loose mat of particles; a layer of heat and fire resistant fabric between the fibrous material layer and the insulating material layer; and means coupling the layers together to form a composite insulating blanket adapted to be placed adjacent to a structural part to be protected.

2. A heat insulating blanket as set forth in claim 1, wherein said fibrous material is a ceramic cloth.

3. A heat insulating blanket as set forth in claim 1, wherein the fibrous material is a silica glass cloth.

4. A heat insulating blanket as set forth in claim 1, wherein said fibrous material is fibrous glass.

5. A heat insulating blanket as set forth in claim 1, wherein said fibrous material is selected from the group including graphite, carbon and aramid fiber cloth.

6. A heat insulating blanket as set forth in claim 1, wherein said resin is a polyimide resin.

7. A heat insulating blanket as set forth in claim 1, wherein said resin is an epoxy.

8. A heat insulating blanket as set forth in claim 1 wherein said resin is a phenolic.

9. A heat insulating blanket as set forth in claim 1, wherein the insulating material has a pair of opposed layers of heat and fire resistant fabric on opposite sides thereof, one of the layers of this fabric being coupled to the layer of fibrous material.

10. A heat insulating blanket as set forth in claim 1, wherein said resin is cured, whereby said layer of fibrous material is sufficiently rigid to support said layer of insulating material.

11. A heat insulating blanket comprising: a layer of fibrous material having a curable thermosetting resin impregnated therein and capable of withstanding temperatures up to a predetermined value; a layer of high temperature thermal insulating material, there being a pair of opposed layers of heat and fire resistant fabric on opposite sides of the layer of insulating material, one of the fabric layers being coupled to the layer of fibrous material; and a thread stitched through said fibrous material layer, the insulating material layer, and the fabric layer for coupling the layers together to form a composite insulating blanket adapted to be placed adjacent to a structural part to be protected.

12. A heat insulating blanket as set forth in claim 11, wherein the thread is formed from a material capable of withstanding a temperature equal to the temperature at which the layer of fibrous material can withstand.

13. A heat insulating blanket comprising: a layer of fibrous material having a curable thermosetting resin impregnated therein and capable of withstanding temperatures up to a predetermined value; a layer of high temperature thermal insulating material; means coupling the layers together to form a composite insulating blanket adapted to be placed adjacent to a structural part to be protected; and an edge binding of said fibrous material, said edge binding surrounding the edge margins of said layer of insulating material.

14. A heat insulating blanket as set forth in claim 13, wherein said edge binding is integral with the layer of fibrous material.

15. A heat insulating blanket as set forth in claim 13, wherein the edge binding is separate from the layer of fibrous material and overlaps the edge margins of said fibrous material layer.

16. A heat insulating blanket as set forth in claim 13, wherein said coupling means includes a thread stitched to said layers and to said edge binding.

17. A fireshield comprising a layer of high temperature thermal insulating material coupled to at least one layer of a woven ceramic cloth made from continuous ceramic fiber, said cloth layer having a curable thermosetting resin impregnated therein and capable of withstanding temperatures up to a predetermined value, said resin adapted to be cured to cause said layer to become rigid and to be self-supporting.

18. A fireshield as set forth in claim 17, wherein said fibrous material is ceramic cloth.

19. A fireshield as set forth in claim 17, wherein said resin is a condensation type polyimide resin.

20. A fireshield as set forth in claim 17, wherein said resin is a self extinguishing phenol resin.

21. A fireshield as set forth in claim 17, wherein said resin is cured, whereby the layer is rigid and self-supporting.

22. A fireshield as set forth in claim 17, wherein said resin is an epoxy.

23. A method of making a fireshield for separating a pair of adjacent structural parts comprising: providing a heat insulating blanket formed from a layer of woven fibrous material impregnated with a curable thermosetting resin and separated from and coupled to a layer of high temperature thermal insulating material by a heat and fire resistant layer of fabric material; arranging the heat insulating blanket in a predetermined shape; and curing the resin when the same has said shape to cause the layer of fibrous material to become relatively rigid and to support the insulating material.

24. A method as set forth in claim 23, wherein said arranging step includes placing the heat insulating blanket on a mold having said predetermined shape.

25. A method as set forth in claim 23, wherein said resin is selected from the group including a polyimide resin, phenolic resin, and an epoxy.

26. A method as set forth in claim 23, wherein said fibrous material is selected from the group including fibrous glass, silica glass cloth, ceramic cloth, graphite, carbon and aramid fiber cloth.

27. A method of making a fireshield for separating a pair of adjacent structural parts of adjacent structural parts comprising: providing a heat insulating blanket formed from a layer of fibrous material impregnated with a curable thermosetting resin and coupled to a layer of high temperature thermal insulating material; placing the heat insulating blanket in a predetermined shape adjacent to a structural part with said layer of fibrous material in engagement with one surface of the structural part; and curing the resin when the same has said shape to cause the layer of fibrous material to become relatively rigid and to support the insulating material, said curing step being performed when said layer of fibrous material is in engagement with said surface, whereby the layer of fibrous material is bonded to said structural part when the resin is cured.

28. A method of making a fireshield for separating a pair of adjacent structural parts of adjacent structural parts comprising: providing a heat insulating blanket formed from a layer of fibrous material impregnated with a curable thermosetting resin and coupled to a layer of high temperature thermal insulating material, said providing step including stitching the layer of fibrous material to said layer of insulating material; arranging the heat insulating blanket in a predetermined shape adjacent to a structural part with said layer of fibrous material in engagement with one surface of the structural part; and curing the resin when the same has said shape to cause the layer of fibrous material to become relatively rigid and to support the insulating material.

29. A method of making a fireshield for separating a pair of adjacent structural parts of adjacent structural parts comprising: providing a heat insulating blanket formed from a layer of fibrous material impregnated with a curable thermosetting resin and coupled to a layer of high temperature thermal insulating material, said providing step including placing a layer of heat and fire resistant fabric between the layer of fibrous material and the layer of insulating material, and stitching said layers together to form said heat insulating blanket; arranging the heat insulating blanket in a predetermined shape; and curing the resin when the same has said shape to cause the layer of fibrous material to become relatively rigid and to support the insulating material.

30. A method of making a fireshield for separating a pair of adjacent structural parts comprising: providing a layer of high temperature thermal insulating material coupled to layer of woven ceramic cloth made from continuous ceramic fiber impregnated with a curable thermosetting resin; forming the layers into a predetermined shape; and curing the resin to cause the impregnated layer to become rigid and self-supporting.

* * * * *